Figure 1:
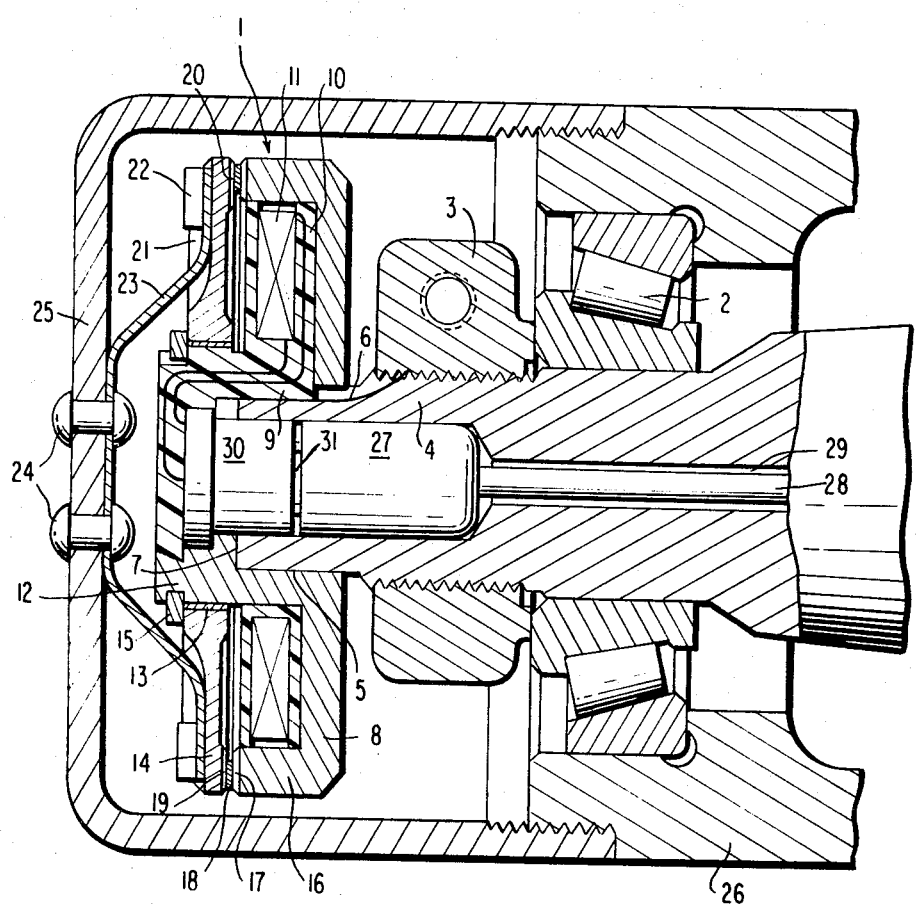

United States Patent
Kruse

[15] 3,683,219
[45] Aug. 8, 1972

[54] MEASUREMENT-SENSING DEVICE FOR DETERMINING A ROTATIONAL SPEED OR ROTATIONAL SPEED CHANGE, PREFERABLY OF VEHICLE WHEELS

[72] Inventor: Werner Kruse, Stuttgart-Wangen, Germany

[73] Assignee: Daimler-Benz Aktiengesellschaft, Stuttgart, Unterturkheim, Germany

[22] Filed: Dec. 8, 1970

[21] Appl. No.: 96,171

[30] Foreign Application Priority Data

Dec. 10, 1969 Germany..........P 19 61 846.3

[52] U.S. Cl. .....................310/168, 310/90, 310/171
[51] Int. Cl. .............................................H02k 17/42
[58] Field of Search........310/158, 159, 90, 166, 168, 310/169, 170, 171, 268, 66, 67

[56] References Cited

UNITED STATES PATENTS

| | | |
|---|---|---|
| 3,489,935 | 1/1970 | Hayes..........................310/67 |
| 3,482,806 | 12/1969 | Trautzsch...................310/67 |
| 3,551,712 | 6/1968 | Jones............................310/67 |
| 3,487,247 | 12/1969 | Scheffler..................310/168 |

*Primary Examiner*—J. D. Miller
*Assistant Examiner*—R. Skudy
*Attorney*—Craig, Antonelli and Hill

[57] ABSTRACT

A measurement sensing device for detecting a rotational speed or rotational speed change, particularly of vehicle wheels, which essentially consists of a rotor and of a stator constructed as magnet and equipped with an annular coil, whereby an A.C. voltage proportional to the rotational speed is induced in the stator by the rotation of the rotor; the rotor and stator are thereby so combined into a structural unit that the rotor is so rotatably supported relative to the stator at the latter or at a part connected therewith that during operation no changes in radial or axial spacing between rotor and stator occur.

20 Claims, 2 Drawing Figures

INVENTOR
WERNER KRUSE

BY Craig, Antonelli, Stewart & Hill
ATTORNEYS

INVENTOR
WERNER KRUSE

BY Craig, Antonelli, Stewart & Hill
ATTORNEYS

MEASUREMENT-SENSING DEVICE FOR DETERMINING A ROTATIONAL SPEED OR ROTATIONAL SPEED CHANGE, PREFERABLY OF VEHICLE WHEELS The present invention relates to a measurement detecting device which is preferably coordinated to a vehicle wheel and which produces pulses proportional to the wheel rotational speed. These pulses may be utilized in a corresponding electronic device for the control of an anti-locking mechanism, of a starting or acceleration swerving protection or of a tachometer.

Installations are already known which produce pulses or signals proportional to the rotational speed. They operate either hydraulically, mechanically, optically or inductively. The inductive measurement transmitting devices are particularly suited for the installation at the vehicle wheel since they operate contactless, i.e., without physical contact. With known types of construction of such devices a disk which is toothed at the outer circumference, is mounted on a shaft or at the wheel hub. To this disk, which may also be designated as rotor, is coordinated a stationary or fixed magnet (stator). The magnetic flux of this magnet is changed by the rotating toothed disk whereby an alternating current voltage is induced at the stator whose frequency is proportional to the wheel rotational speed. The distance between stator and rotor must thereby change only very slightly for a constant pulse sequence as otherwise the pulses are missing or the pulse transmitter is destroyed in effect in case of contact of stator and rotor. Many axle constructions make impossible an accurate constant distance between stator and rotor. In order to ensure the proper functioning and operation of the pulse transmitter, the number of pulses per wheel rotation is decreased to such an extent until a spacing between stator and rotor is found matched to the respective flexures or oscillations of the axle construction. However, this low number of pulses suffices only conditionally for an accurate and rapidly effective anti-locking mechanism. Apart from these basic disadvantages the prior art pulse transmitters are exposed to soiling and corrosion due to the unprotected location thereof. Also damages due to thrown-up stones or during the installation or disassembly of the axles are possible. With many axle constructions, a subsequent installation is possible only after very extensive constructive changes by reason of the large space requirement.

The present invention aims at so constructing an inductive measurement detecting device that it remains uninfluenced by shaft deflections or oscillations and can be accommodated within a protected space.

As solution to the underlying problem, a measurement sensing device for the determination of a rotational speed or of a rotational speed change, preferably of vehicle wheels, is proposed which essentially consists of a rotor and of a stator constructed as magnet and equipped with a ring coil, whereby an A.C. voltage proportional to the rotational speed is induced in the rotor by the rotation of the stator, in which according to the present invention the rotor and stator are so combined into a structural unit that the rotor is rotatably supported relative to the stator at the latter or at a part connected therewith in such a manner that during the operation no radial or axial changes in spacing between rotor and stator occur.

The rotary movement is thereby transmitted to the rotor preferably by an elastic entrainment member which is constructed as leaf spring.

According to a particularly preferred embodiment of the present invention, the rotor and stator are provided at mutually opposite end faces with end teeth that do not contact one another, whereby an axial friction or sliding bearing is formed by layers of non-magnetic friction bearing material applied on the end teeth so that a certain axial distance of rotor and stator is determined by the layer thicknesses over the tooth tips.

However, the rotor may also be provided with an internally toothed arrangement and the stator with an externally toothed arrangement or vice versa whereby the toothed arrangements are arranged at such a radial distance that they do not contact one another.

A very large number of pulses can be achieved by such a type of arrangement and construction of the measuring detecting device since the corresponding tooth pitch on the rotor and stator can be selected very small. The influence of deflections and vibrations or oscillations is compensated by the elastic entrainment means. The compact type of construction enables the installation in the sealed space of the wheel bearing.

Accordingly, it is an object of the present invention to provide a measuring detecting device for determining a rotational speed or rotational speed change of vehicle wheels which avoids the aforementioned shortcomings and drawbacks encountered in the prior art.

Another object of the present invention resides in a measuring sensing device for detecting rotational speeds or rotational speed changes which permits the realization of relatively large number of pulses per rotation of the wheel without the danger of damage or faulty operation of the detecting device.

A further object of the present invention resides in a rotational speed sensing device of the type described above which can be accommodated within a protected, sealed space to avoid soiling and prevent harmful external influences on the device.

A still further object of the present invention resides in a measurement sensing device for detecting rotational speeds of vehicle wheels or changes in the rotational speeds thereof which can be readily installed into existing axle constructions yet is substantially immune to destruction due to contact between rotor and stator.

Figure 2:
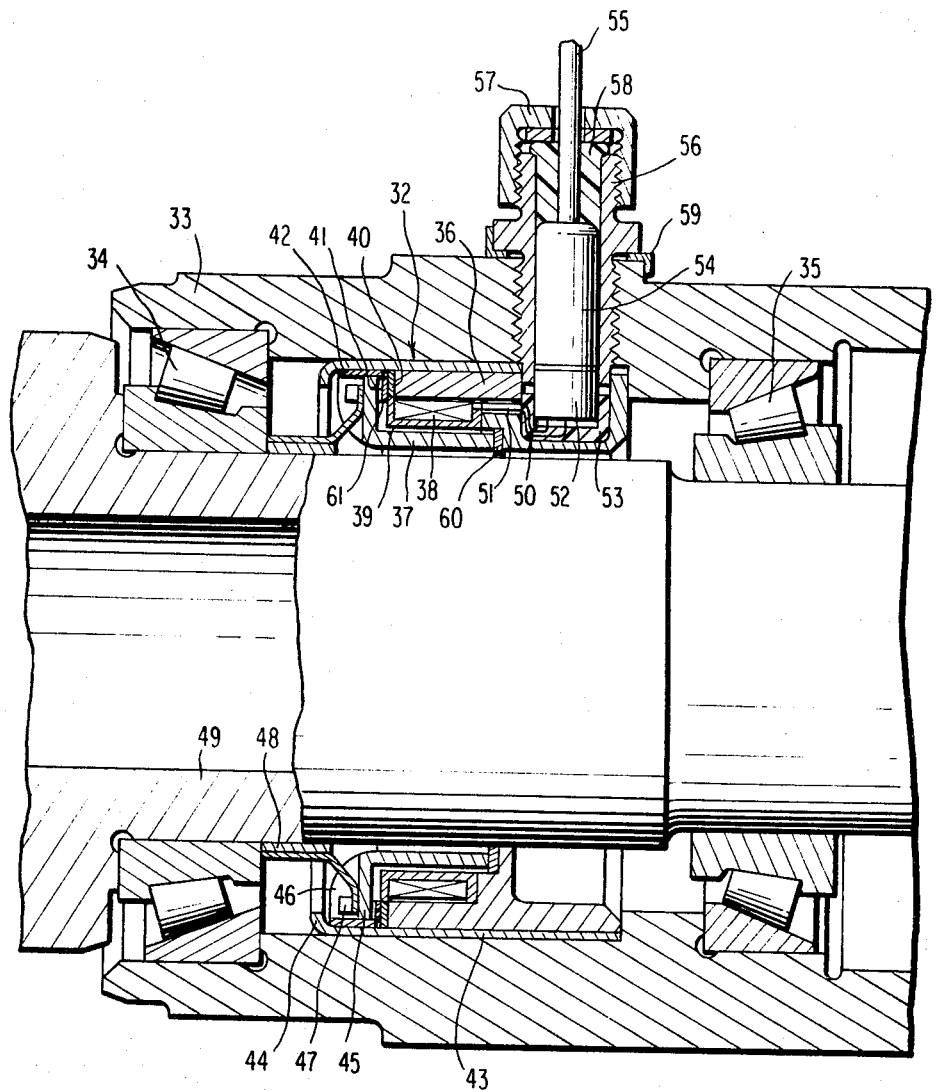

These and further objects, features and advantages of the present invention will become more obvious from the following description when taken in connection with the accompanying drawing which shows, for purposes of illustration only, two embodiments in accordance with the present invention, and wherein:

FIG. 1 is a partial cross-sectional view through a front axle bearing with mounted measuring sensing device in accordance with the present invention; and FIG. 2 is a partial cross-sectional view through a rear axle bearing with inserted measuring sensing device in accordance with the present invention.

Referring now to the drawing, and more particularly to FIG. 1, the measuring sensing or detecting device generally designated by reference numeral 1 is mounted over the axle 4 outside of the outer front wheel bearing 2 and of the lock nut 3. The outer end of the axle 4 is provided with a cylindrical seat or fit 5 and a longitudinal groove 6. The measurement sensing device 1 is mounted over the axle 4 up to the abutment 7 of the stator 8 and is secured against rotation by a nose 9 in the coil body 10 which engages in the longitudinal groove 6. The stator 8 is constructed as annular member with U-shaped cross section. The coil body 10 with the coil winding 11 is inserted on the inside of the U-shaped cross section. The inner leg portion 12 of the stator body 8 carries a radial friction bearing 13 on which is supported the rotor 14. This friction bearing 13 consists preferably of a magnetic material in order to keep small the magnetic resistance between stator 8 and rotor 14. The friction bearing 13 and the rotor 14 are held on the stator 8 by a snap ring 15.

The outer leg portion 16 of the stator 8 carries at its free end an end-face toothed arrangement or serration 17 whose tooth gaps and tooth tips are coated with a non-magnetic friction bearing material so that a smooth surface results which forms an axial friction bearing 18 for the rotor 14. The end-face toothed arrangement or serration 19 on the outer circumference of the disk-shaped rotor 14 is coated, in a similar manner as the stator 8, with a friction bearing material that forms the other contact surface 20 of the axial friction bearing 18. The thickness of the two contact surfaces determines the distance between the rotor 14 and the stator 8 with the rotor and stator serving as counter contact elements for one another. One or several radially extending grooves 21 on the back side of the rotor 14 accommodate the free end of an entrainment member 23 constructed as leaf spring that may have several arms. Advantageous with the use of a leaf spring is the high rigidity thereof in the direction of rotation. The spring forces need not be all too large in the axial direction because the rotor 14 is attracted toward the stator 8 by the magnetic forces. The entrainment member 23 is non-rotatably connected by means of two rivets 24 with the screwed-on cap 25 for rotation in unison therewith, which is screwed on the wheel hub 26.

The electrical connection is established appropriately by a coaxial connector. For that purpose a plug 27 which is secured at a cable 28, is introduced into an offset bore of the axle 4. The associated counter-part 30 of the plug 27 is rigidly molded or cast into the stator 8 in any conventional manner. The separating place 31 of the connector is disposed on the inside of the bore 29 in order that the contacts are not damaged with a disassembled measuring sensing device.

In FIG. 2, a measuring sensing device generally designated by reference numeral 32 is illustrated which is installed as structural unit in the wheel carrier 33 between the two bearings 34 and 35. The stator 36 and the rotor 37 are so constructed that they enclose the coil 38 with the coil body 39. An end-face toothed arrangement or serration 40 of the stator 36 and an end-face toothed arrangement 41 of the rotor 37 are again covered with a non-magnetic material so that an axial friction bearing 61 is formed. The L-shaped rotor 37 may carry on its longer leg portion a further axial bearing 60 which, however, only serves the purpose not to interrupt the magnetic circuit by a large air gap. Consequently, the axial bearing 60 is appropriately made from a magnetic friction bearing material. Radially, the rotor 37 is guided by a sliding or bearing ring 42 which is made from non-magnetic material. This bearing ring 42 is disposed between the short leg portion of the L-shaped rotor 37 and a tubularly shaped, non-magnetic sheet metal jacket or case 43 which is pressed over the stator 36 and holds together the rotor 37 and stator 36 by a flange 44.

The rotor 37 carries at the outer side of its short leg portion 45 a radially extending groove 46 into which engages a leaf spring 47. The leaf spring 47 is secured at a ring 48 which is non-rotatably mounted on the shaft 49 for rotation in unison therewith. The ring 48 and leaf spring 47 form the entrainment member for the rotor 37.

Two wires 50 lead from the coil 38 through a bore 51 in the stator 36 to a female connector member 52 which is molded-in by means of synthetic resinous material into the bore 53 of the stator 36. The plug 54 together with a cable 55 is guided in a threaded bush 56 and is secured by a screw cap 57. The rubber ring 58 forms for the cable 55 a tensional stress relief and simultaneously seals the plug 54 against moisture from the outside. The threaded bush 56 is so constructed that it projects into the bore 53 of the stator 36 whereby the stator 36 is fixed in the axial direction within the wheel carrier 33. The threaded bush 56 is secured by a sheet metal member 59.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A measuring sensing device for detecting a rotational speed or a rotational speed change, which includes a rotor means and a stator means constructed as magnet and having a coil, whereby an A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, and that the rotary movement is transmitted to the rotor means by an elastic entrainment means.

2. A measuring sensing device according to claim 1, characterized in that the entrainment means is constructed as leaf spring.

3. A measuring sensing device for detecting a rotational speed or a rotational speed change, which includes a rotor means and a stator means constructed as magnet and having a coil, whereby an A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, and that the rotor means is supported at the stator means by way of first friction bearing means in the form of a slide bearing providing for the radial guidance thereof and second friction bearing means in the form of a slide bearing providing for the axial guidance thereof.

4. A measuring sensing device according to claim 3, characterized in that at least one of the friction bearing means consists of an iron-containing material.

5. A measuring sensing device for detecting a rotational speed or a rotational speed change, which includes a rotor means and a stator means constructed as magnet and having a coil, whereby an A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, the rotor and stator means being provided at mutually opposite end-faces with end-face tooth means that do not contact one another, and that an axial friction bearing means is formed by layers of non-magnetic friction bearing material applied to the end-face tooth means so that a certain axial distance of rotor and stator means is determined by the layer thicknesses over the tooth tips.

6. A measuring sensing device for detecting a rotational speed or a rotational speed change, which includes a rotor means and a stator means constructed as magnet and having a coil, whereby A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, one of the rotor and stator means being provided with internal tooth means and the other with external tooth means whereby the tooth means are arranged at such a radial distance that they do not contact one another, and radial friction bearing means being formed by layers of non-magnetic friction bearing material applied over the tooth means for maintaining the distance between the tooth means.

7. A measuring sensing device for detecting a rotational speed or a rotational speed change, which includes a rotor means and a stator means constructed as magnet and having a coil, whereby an A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, and that at least one of the two parts consisting of rotor and stator means essentially consists of a synthetic resinous material containing iron.

8. A measuring sensing device according to claim 7, characterized in that both rotor and stator means are made from iron-containing synthetic resinous material.

9. A measuring sensing device for detecting a rotational speed or a rotational speed change, which includes a rotor means and a stator means constructed as magnet and having a coil, whereby an A.C. voltage proportional to the rotational speed is induced in the stator means as a result of the rotation of the rotor means, characterized in that the rotor and stator means are so combined into a structural unit that the rotor means is rotatably supported relative to the stator means at least on a part connected with said stator means in such a manner that during the operation substantially no changes in at least one of the radial and axial distances between rotor and stator means can occur, at least one of the rotor and stator means being partially magnetized, and only the counter element formed of the other of the two parts consisting of rotor and stator means being provided with a toothed means.

10. A measuring sensing device according to claim 2, characterized in that the rotor means is supported at the stator means by way of an friction bearing means which guides the rotor means in the radial and axial directions.

11. A measuring sensing device according to claim 1, characterized in that the rotor means is supported at the stator means by way of at least one friction bearing means.

12. A measuring sensing device according to claim 11, characterized in that separate friction bearing means in the form of slide bearings are provided for the radial and axial guidance.

13. A measuring sensing device according to claim 2, characterized in that the rotor and stator means are provided at mutually opposite end-faces with end-face tooth means that do not contact one another.

14. A measuring sensing device according to claim 13, characterized in that an axial friction bearing means is formed by layers of non-magnetic friction bearing material applied to the end-face tooth means so that a certain axial distance of rotor and stator means is determined by the layer thicknesses over the tooth tips.

15. A measuring sensing device according to claim 14, characterized in that a radial friction bearing means is formed by layers of non-magnetic friction bearing material applied over the tooth means.

16. A measuring sensing device according to claim 2, characterized in that at least one of the two parts consisting of rotor and stator means essentially consists of a synthetic resinous material containing iron.

17. A measuring sensing device according to claim 2, characterized in that both rotor and stator means are made from iron-containing synthetic resinous material.

18. A measuring sensing device according to claim 2, characterized in that at least one of the rotor and stator means is partially magnetized.

19. A measuring sensing device according to claim 2, characterized in that both rotor and stator means are partially magnetized.

20. A measuring sensing device according to claim 18, characterized in that only the counter element formed of the other of the two parts consisting of rotor and stator means is provided with a toothed means.

* * * * *